(12) United States Patent
Yoshigi

(10) Patent No.: US 11,131,981 B2
(45) Date of Patent: Sep. 28, 2021

(54) FUNCTIONAL SAFETY MODULE FOR INDUSTRIAL DEVICES

(71) Applicant: DENSO WAVE INCORPORATED, Chita-gun (JP)

(72) Inventor: Masayasu Yoshigi, Chita-gun (JP)

(73) Assignee: DENSO WAVE INCORPORATED, Chita-Gun (JP)

( * ) Notice: Subject to any disclaimer, the term of this patent is extended or adjusted under 35 U.S.C. 154(b) by 63 days.

(21) Appl. No.: 16/541,263

(22) Filed: Aug. 15, 2019

(65) Prior Publication Data
US 2020/0073359 A1 Mar. 5, 2020

(30) Foreign Application Priority Data

Aug. 29, 2018 (JP) .............................. JP2018-160260

(51) Int. Cl.
*G05B 19/406* (2006.01)

(52) U.S. Cl.
CPC .. *G05B 19/406* (2013.01); *G05B 2219/50193* (2013.01)

(58) Field of Classification Search
CPC ................... G05B 19/406; G05B 2219/50193
See application file for complete search history.

(56) References Cited

U.S. PATENT DOCUMENTS

| 2007/0067674 | A1* | 3/2007 | Essame ............... | G06F 11/1633 714/14 |
| 2014/0190773 | A1* | 7/2014 | Sonnenmoser ....... | B66B 5/0006 187/247 |
| 2014/0214201 | A1* | 7/2014 | Takemoto .............. | B25J 9/1674 700/245 |
| 2018/0052434 | A1 | 2/2018 | Maekawa | |
| 2018/0203059 | A1* | 7/2018 | Sacco ................ | G01R 31/3187 |
| 2019/0383873 | A1* | 12/2019 | Hojabri .............. | G01R 31/3167 |

FOREIGN PATENT DOCUMENTS

JP 2018-032086 A 3/2018

* cited by examiner

*Primary Examiner* — Gary Collins
(74) *Attorney, Agent, or Firm* — Harness, Dickey & Pierce, P.L.C.

(57) ABSTRACT

The present disclosure provides a functional safety module for industrial devices, the functional safety module being connected between the industrial devices to manage safety according to a state of the industrial devices. The functional safety module may include a first controller and a second controller each configured to execute a common predetermined operation command including operation commands. The first controller is configured to output digital signals, and sequentially convert the digital signals into analog voltages. The second controller is configured to receive the analog voltages, sequentially converts the analog voltages, and outputs the digital signals, and determine whether the first controller is normal.

10 Claims, 4 Drawing Sheets

FUNCTIONAL SAFETY MODULE FOR INDUSTRIAL DEVICES

CROSS-REFERENCE OF RELATED APPLICATION

The present application claims the benefit of priority from Japanese Patent Application No. 2018-160260 filed on Aug. 29, 2018. The entire disclosures of all of the above applications are incorporated herein by reference.

TECHNICAL FIELD

The present disclosure relates to a functional safety module that is connected between industrial devices and manages safety according to a state of the industrial devices.

BACKGROUND

A functional safety module connected between a switch and a programmable logic controller (PLC) issuing a command of operation or stop to equipment such as a robot, and managing safety according to a state of the switch has been known. A functional safety module in a related art disconnects communication between a PLC and a switch when the switch is pressed to stop the robot by using the PLC.

SUMMARY

The present disclosure provides a functional safety module for industrial devices, the functional safety module being connected between the industrial devices to manage safety according to a state of the industrial devices. The functional safety module may include a first controller and a second controller each configured to execute a common predetermined operation command including operation commands. The first controller is configured to output digital signals, and sequentially convert the digital signals into analog voltages. The second controller is configured to receive the analog voltages, sequentially converts the analog voltages, and outputs the digital signals, and determine whether the first controller is normal.

BRIEF DESCRIPTION OF DRAWINGS

Features and advantages of the present disclosure will become more apparent from the following detailed description with reference to the accompanying drawings. In the drawings.

DETAILED DESCRIPTION

Figure 1:
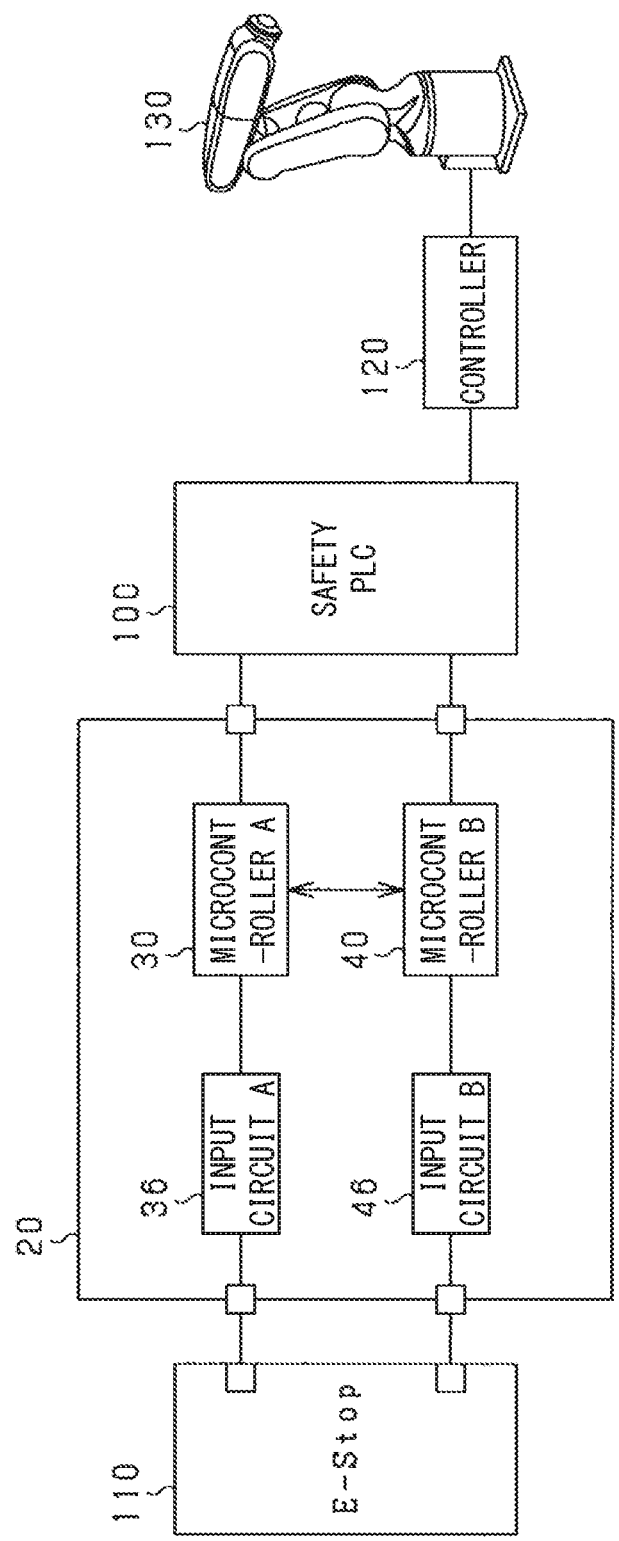
FIG. 1 is a schematic diagram of a robot system.

A type of functional safety module may have a dual-system controller to securely operate the functional safety module. According to this type of functional safety module, a first controller transmits an operation sequence (corresponding to an order of operation commands) to a second controller. The second controller determines whether the received operation sequence matches an expected value of the operation sequence. When the operation sequence does not match the expected value, the second controller requests the first controller to re-transmit the operation sequence, and re-receives the operation sequence. The second controller determines that the first controller is normal when the re-received operation sequence matches the expected value. The second controller determines that the first controller is abnormal when the re-received operation sequence does not match the expected value.

According to this determination method, erroneous determination of abnormality of the first controller may be prevented by re-transmitting the operation sequence and performing re-determination even when noise is mixed in the operation sequence transmitted first. However, the necessity of re-transmission and re-determination of the operation sequence may increase a time required for completion of the determination.

The present disclosure may provide a functional safety module for industrial devices, in which the module is capable of promptly determining whether a controller of a dual system is normal while reducing erroneous determination that one of the controllers of the dual system is abnormal.

According to one aspect of the present disclosure, a functional safety module for industrial devices, the functional safety module being connected between the industrial devices to manage safety according to a state of the industrial devices is provided. The functional safety module may include: a first controller and a second controller each configured to execute a common predetermined operation command including a plurality of operation commands. The first controller includes a voltage value output portion that sequentially outputs respective digital signals indicating respective voltage values corresponding to respective operation commands executed by the first controller, and a first conversion portion that sequentially converts the respective digital signals sequentially output from the voltage value output portion into respective analog voltages each of which continues for a predetermined period, and transmits the respective analog voltages. The second controller includes a second conversion portion that receives the respective analog voltages sequentially transmitted from the first conversion portion, sequentially converts the received analog voltages a plurality of times within the predetermined period into respective digital signals indicating respective voltage values corresponding to the respective analog voltages, and outputs the respective digital signals, and a determination portion that determines whether the first controller is normal based on a comparison between the respective digital signals sequentially output from the second conversion portion and the respective digital signals corresponding to the respective operation commands of the predetermined operation command.

According to the configuration described above, the functional safety module is connected between industrial devices to manage safety according to a state of one of the industrial devices. A common predetermined operation command including multiple operation commands is executed by the first controller and the second controller. Accordingly, the second controller recognizes in advance the predetermined operation command (corresponding to an expected value) executed by the first controller.

The voltage value output portion of the first controller sequentially outputs respective digital signals indicating respective voltage values corresponding to respective operation commands executed by the first controller. Subsequently, the first conversion portion sequentially converts the respective digital signals sequentially output into respective analog voltages each continuing for a predetermined period, and transmits the analog voltages. Accordingly, a series of the operation commands (corresponding to an operation sequence) executed by the first controller is represented by the respective analog voltages continuing for the predetermined period and sequentially transmitted.

The second conversion portion of the second controller receives respective analog voltages sequentially transmitted, sequentially converts the respective received analog voltages multiple times within the predetermined period into respective digital signals indicating respective voltage values corresponding to the respective analog voltages, and outputs the digital signals. Accordingly, it may be possible to output the respective analog voltages corresponding to the respective operation commands multiple times within the predetermined period. In addition, each of the operation commands is represented by a magnitude of the corresponding analog voltage. Accordingly, it may be possible to shorten the predetermined period required for continuously transmitting the respective analog voltages as compared with a period required for transmitting the digital signals each representing the corresponding operation command.

Thereafter, the determination portion determines whether the first controller is normal based on a comparison between the multiple digital signals sequentially output from the second conversion portion and the respective digital signals corresponding to the respective operation commands of the predetermined operation command of the second controller. The second controller and the first controller both constitute a dual system and thus perform the same process at the same timing. The second controller is capable of creating comparison data for determination while following the first controller even when determination signals based on complex signals different for each operation command, such as "the respective digital signals indicating the respective voltage values corresponding to the respective operation commands executed by the first controller" as described above are sent from the first controller. Accordingly, the second controller need not receive comparison data for determination from the first controller. It may be possible to reduce a time required for the determination. Moreover, the signals generated from "the respective digital signals indicating the respective voltage values corresponding to the respective operation commands executed by the first controller" are not uniform from the beginning to the end but variable in a complicated manner even within a series of signals. In this case, the signals come into different signal states within the series of signals in accordance with a change of the determination timing. Accordingly, whether the respective operation commands executed by the first controller are normal can be determined substantially multiple times based on one signal transmission, and it may be possible to improve an accuracy of the determination. The functional safety module for the industrial devices therefore is capable of promptly determining whether the first controller is normal while reducing erroneous determination that the first controller is abnormal.

Furthermore, the second conversion portion may convert the received respective analog voltages three times or more as three or more respective digital signals, within the predetermined period into respective digital signals indicating respective voltage values corresponding to the respective analog voltages, and may output the respective digital signals. The determination portion may check a continuity of signals based on a comparison result between the three or more respective digital signals output from the second conversion portion and the respective digital signals corresponding to the respective operation commands of the predetermined operation command, and may determine whether the first controller is normal.

According to the configuration described above, the second conversion portion converts the received respective analog voltages three times or more within the predetermined period into the respective digital signals indicating respective voltage values corresponding to the respective analog voltages, and outputs the digital signals. Accordingly, whether the respective operation commands executed by the first controller are normal can be determined substantially three times or more. Furthermore, continuity of the signals is checked to determine whether the first controller is normal based on a comparison result between the three or more digital signals and the respective digital signals corresponding to the respective operation commands of the predetermined operation command.

Furthermore, the determination portion may determine that the first controller is normal in response to that the determination portion confirms the continuity of a result that the three or more respective digital signals output from the second conversion portion are considered to be identical to the respective digital signals corresponding to the respective operation commands of the predetermined operation command.

Furthermore, the determination portion may determine that the first controller is abnormal in response to that a total number of results that the three or more respective digital signals output from the second conversion portion are not considered to be identical to the respective digital signals corresponding to the respective operation commands of the predetermined operation command is larger than a total number of results that the three or more respective digital signals are considered to be identical to the respective digital signals. Incidentally, when the operation commands executed by the first controller are normal, the number of results that the three or more digital signals output from the second conversion portion are not considered to be identical to the respective digital signals corresponding to the respective operation commands of the predetermined operation command may become larger than the number of results that these digital signals are considered to be identical to each other. In such a case, the first controller which is normal is erroneously determined to be abnormal. However, this erroneous determination is less likely to cause problems in terms of safety than such erroneous determination that the first controller which is abnormal is erroneously determined to be normal.

Furthermore, the determination portion may determine that a noise occurs in response to that a total number of results that the three or more respective digital signals output from the second conversion portion are considered to be identical to the respective digital signals corresponding to the respective operation commands of the predetermined operation command is larger than a total number of results that the three or more respective digital signals are not considered to be identical to the respective digital signals and also in response to a presence of at least one result that the three or more respective digital signals are not considered to be identical to the respective digital signals. Accordingly, it can be determined noise has been produced in addition to whether the first controller is normal.

Furthermore, the determination portion may consider that the respective digital signals output from the second conversion portion are identical to the respective digital signals corresponding to the respective operation commands of the predetermined operation command under a condition that a degree of a difference between the respective digital signals output from the second conversion portion and the respective digital signals corresponding to the respective operation commands of the predetermined operation command is smaller than a predetermined degree.

According to the configuration described above, the degree of the difference between the respective digital signals output from the second conversion portion and the respective digital signals corresponding to the respective operation commands of the predetermined operation command becomes larger than the predetermined degree when the respective operation commands executed by the first controller are abnormal. Accordingly, the respective digital signals output from the second conversion portion are not considered to be identical to the respective digital signals corresponding to the respective operation commands of the predetermined operation command. On the other hand, the degree of the difference between the respective digital signals output from the second conversion portion and the respective digital signals corresponding to the respective operation commands of the predetermined operation command becomes smaller than the predetermined degree when the respective operation commands executed by the first controller are normal. Accordingly, the respective digital signals output from the second conversion portion are considered to be identical to the respective digital signals corresponding to the respective operation commands of the predetermined operation command. The state that the degree of the difference between the two types of digital signals is smaller than the predetermined degree can be determined based on a state that the absolute value of the difference between the two types of digital signals is smaller than a positive threshold, or that the ratio of the two types of digital signals falls within a predetermined range including 1.

It is rare that the respective analog voltages transmitted from the first conversion portion are accidentally close to respective analog voltages corresponding to the respective normal operation commands when the respective operation commands executed by the first controller are abnormal and noise is mixed in the respective received analog voltages. Accordingly, the respective operation commands executed by the first controller are less likely to be erroneously determined to be normal in the state that the respective operation commands executed by the first controller are abnormal.

Furthermore, the determination portion may determine that at least either the first conversion portion or the second conversion portion is abnormal based on a comparison between the respective digital signals sequentially output from the second conversion portion and the respective digital signals corresponding to the respective operation commands of the predetermined operation command. For example, at least either the first conversion portion or the second conversion portion is determined to be abnormal when all the digital signals output from the second conversion portion have values not expected as values of the respective digital signals corresponding to the respective operation commands of the predetermined operation command.

An embodiment of a functional safety module for a robot system will be described with reference to the drawings. A robot system is an assembly system used in a machine assembly factory or the like.

As shown in FIG. 1, the robot system includes a robot 130, a controller 120, a safety PLC 100, a functional safety module 20, and an emergency stop switch 110.

The safety PLC 100 is connected to the controller 120 via a cable. The controller 120 is connected to the robot 130 via a cable. The safety PLC 100 outputs an operation command and a stop command to the controller 120 to operate and stop the robot 130. The controller 120 controls operation of the robot 130 based on the operation command input from the safety PLC 100. The controller 120 may be referred to as a robot controller. For example, the robot 130 may be a six-axis vertical articulated robot or a horizontal articulated robot. A not-shown high-order controller may also be connected to the safety PLC 100.

The safety PLC 100 and the emergency stop switch 110 are connected to the functional safety module 20 via a communication line such as a local area network (LAN). According to the present embodiment, the functional safety module 20 is a remote input/output (I/O) that establishes communication between the safety PLC 100 and the emergency stop switch 110. In other words, the functional safety module 20 is connected between the safety PLC 100 and the emergency stop switch 110 to manage safety according to a state of the emergency stop switch 110.

When an operator presses the emergency stop switch 110, the emergency stop switch 110 outputs an emergency stop signal for commanding an emergency stop of the robot 130. When the operator does not press the emergency stop switch 110, the emergency stop switch 110 does not output the emergency stop signal.

The functional safety module 20 includes a microcontroller A 30, a microcontroller B 40, an input circuit A 36, and an input circuit B 46. A microcontroller may be referred to as a microprocessor, a microcomputer.

The input circuit A 36 and the input circuit B 46 each receive an emergency stop signal from the emergency stop switch 110. The input circuit A 36 and the input circuit B 46 output the received emergency stop signal to the microcontroller A 30 and the microcontroller B 40, respectively. The microcontroller A 30 (corresponding to a first controller in the present disclosure) and the microcontroller B 40 (corresponding to a second controller in the present disclosure) output the emergency stop signal received from the input circuit A 36 and the input circuit B 46, respectively, to the safety PLC 100. The microcontroller A 30 and the microcontroller B 40 execute a common predetermined operation command including multiple operation commands in the process of receiving the emergency stop signal from the input circuit A 36 and the input circuit B 46, respectively, and outputting the emergency stop signal.

The safety PLC 100 outputs an operation command to the controller 120 when not receiving the emergency stop signal from either the microcontroller A 30 or the microcontroller B 40. The safety PLC 100 outputs a stop command to the controller 120 when receiving the emergency stop signal from at least either the microcontroller A 30 or the microcontroller B 40.

Figure 2:
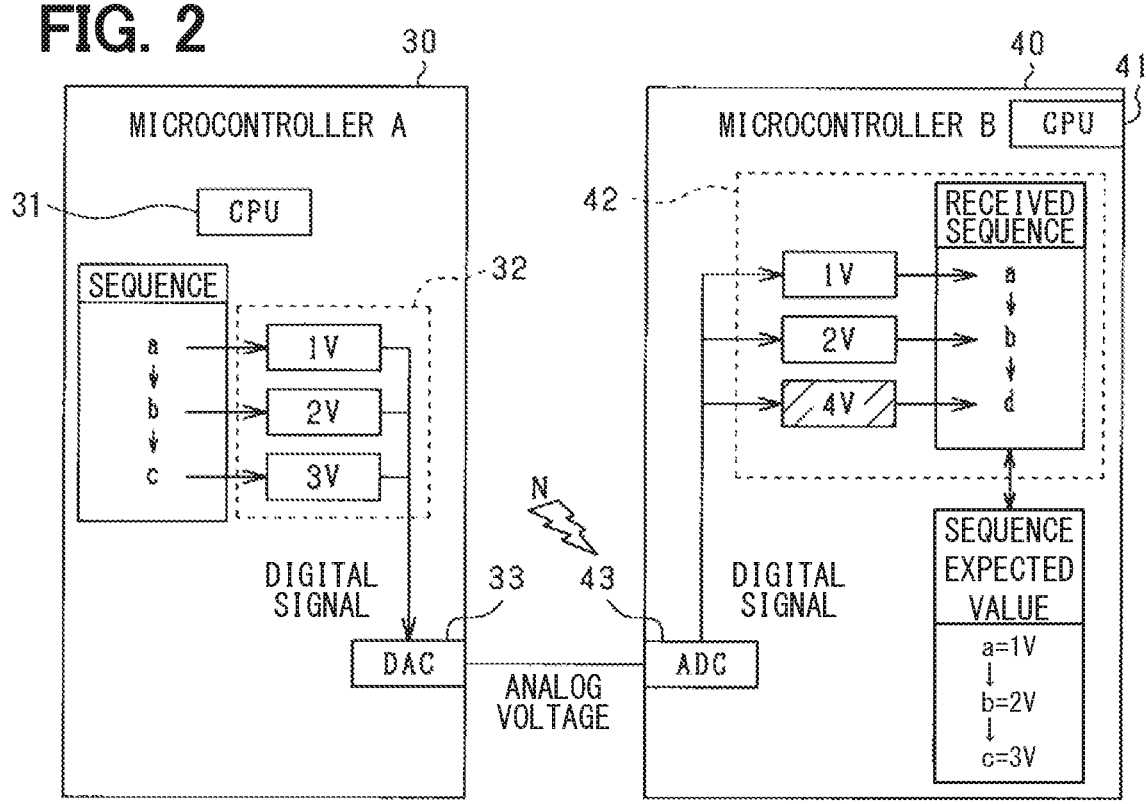
FIG. 2 is a schematic diagram showing a microcontroller A and a microcontroller B.

FIG. 2 is a schematic diagram showing the microcontroller A 30 and the microcontroller B 40. The microcontroller A 30 includes a central processing unit (CPU) 31, a voltage value output portion 32, and a digital to analog converter (DAC) 33. The CPU 31 executes the predetermined operation command. The predetermined operation command (corresponding to an operation sequence) includes a series of operation commands designated as operation commands a, b, and c in this order, for example. The CPU 31 sequentially records the executed operation commands to produce an operation sequence (may be referred to as a sequence report). For example, the operation sequence may be stored in a memory. Each of the operation commands a, b, and c may correspond to an operation instruction.

The voltage value output portion 32 sequentially outputs respective digital signals indicating respective voltage values 1V, 2V, and 3V corresponding to the respective operation commands a, b and c executed by the CPU 31 based on the recorded operation sequence. The operation command a corresponds to a voltage value of 1V. The operation command b corresponds to a voltage value of 2V. The operation command c corresponds to a voltage value of 3V. The operation command d corresponds to a voltage value of 4V. In other words, each of the operation commands different from each other is associated with the corresponding one of the voltage values different from each other. The voltage value output portion 32 sequentially outputs respective digital signals ds (1V), ds (2V), and ds (3V) indicating the voltage values 1V, 2V, 3V, respectively. The example described herein is a case where the CPU 31 normally executes the predetermined operation command.

Figure 3:
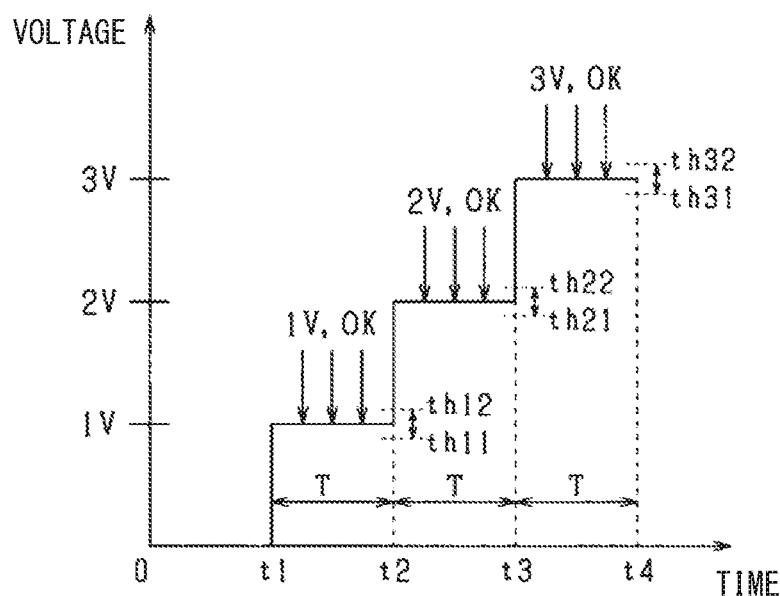
FIG. 3 is a time chart showing analog voltages in a normal state.

The DAC 33 (corresponding to a first conversion portion) sequentially converts the respective digital signals ds (1V), ds (2V), and ds (3V) sequentially output from the voltage value output portion 32 into analog voltages of 1V, 2V, and 3V, respectively, each continuing for a predetermined period T, and transmits the respective analog voltages. For example, as shown in FIG. 3, the DAC 33 transmits the analog voltage of 1V for the predetermined period T from a time t1 to a time t2, transmits the analog voltage of 2V for the predetermined period T from the time t2 to a time t3, and transmits the analog voltage of 3V for the predetermined period T from the time t3 to a time t4.

The microcontroller B 40 includes a CPU 41, a determination portion 42, and an analog to digital converter (ADC) 43. The CPU 41 executes the predetermined operation command. The CPU 41 retains the digital signals ds (1V), ds (2V), ds (3V) corresponding to the respective operation commands a, b, and c of the predetermined operation command as expected values corresponding to the respective operation commands a, b, and c of the predetermined operation command executed by the microcontroller A 30. Incidentally, the sequence expected values may be stored in a memory of a microcontroller B.

The ADC 43 (corresponding to a second conversion portion) receives the respective analog voltages of 1V, 2V, and 3V sequentially transmitted from the DAC 33, sequentially converts the received respective analog voltages several times within the predetermined period T into the respective digital signals ds (1V), ds (2V), and ds (3V) indicating respective voltage values corresponding to the respective analog voltages 1V, 2V, and 3V, and outputs the respective digital signals. For example, as shown in FIG. 3, the DAC 33 converts the analog voltage of 1V into the digital signal ds (1V) three times within the predetermined period T from the time t1 to the time t2, and outputs the digital voltage ds (1V). The DAC 33 converts the analog voltage of 2V into the digital signal ds (2V) three times within the predetermined period T from the time t2 to the time t3, and outputs the digital signal ds (2V). The DAC 33 converts the analog voltage of 3V into the digital signal ds (3V) three times within the predetermined period T from the time t3 to the time t4, and outputs the digital signal ds (3V).

The predetermined period T is a period shorter than a period required to transmit the digital signal ds indicating one voltage value from the microcontroller A 30 to the microcontroller B 40 by serial communication (e.g., 80 µs), and equal to or longer than a period sufficient for converting the analog voltage into the digital signal ds multiple times (e.g., three times) and outputting the converted digital signal ds from the ADC 43 (e.g., 3 µs). The predetermined period T may be a period longer than 3 µs and shorter than 80 µs (that is, 3 µs<T<80 µs).

As shown in FIG. 2, the determination portion 42 determines whether the microcontroller A 30 is normal based on a comparison between the multiple digital signals sequentially output from the ADC 43 and the respective digital signals ds corresponding to the respective operation commands of the predetermined operation command (corresponding to operation sequence expected values). More specifically, the determination portion 42 compares the digital signals ds output in the first, second, and third predetermined periods T, and the digital signals ds corresponding to the first, second, and third operation commands of the predetermined operation command. The determination portion 42 considers that the respective digital signals ds output from the ADC 43 are identical to the respective digital signals ds corresponding to the respective operation commands of the predetermined operation command under a condition that a degree of a difference between the respective digital signals ds output from the ADC 43 and the respective digital signals ds corresponding to the respective operation commands of the predetermined operation command is smaller than a predetermined degree.

For example, when the digital signal ds obtained by converting the analog voltage corresponding to the first operation command (time t1 to time t2) by the ADC 43 and output from the ADC 43 is higher than a lower limit value th11 corresponding to the operation command a and lower than an upper limit value th12 corresponding to the operation command a, the determination portion 42 considers that the first digital signal ds output from the ADC 43 is identical to the digital signal ds (1V) corresponding to the operation command a as shown in FIG. 3. In other words, the determination portion 42 determines that the first operation command executed by the microcontroller A 30 is the operation command a. For example, the lower limit value th11 is 0.9 V, and the upper limit value th12 is 1.1 V. When the digital signal ds output from the ADC 43 is equal to or lower than the lower limit value th11, or when the digital signal ds output from the ADC 43 is equal to or higher than the upper limit value th12, the determination portion 42 considers that the digital signal ds output from the ADC 43 is not identical to the digital signal ds (1V) corresponding to the operation command a. In other words, the determination portion 42 determines that the first operation command executed by the microcontroller A 30 is not the operation command a. Thereafter, the determination portion 42 determines analog voltages (time t2 to time t3 and time t3 to time t4) corresponding to the second and third operation commands in a similar manner.

The determination portion 42 further checks continuity of the signals based on a comparison result between the three digital signals ds output from the ADC 43 and the corresponding digital signals ds, and determines whether the microcontroller A 30 is normal. More specifically, the determination portion 42 determines that the operation commands executed by the microcontroller A 30 are normal, and therefore that the microcontroller A 30 is normal when confirming continuity of a result that the three digital signals ds output from the ADC 43 are considered to be identical to the corresponding digital signals ds.

Figure 4:
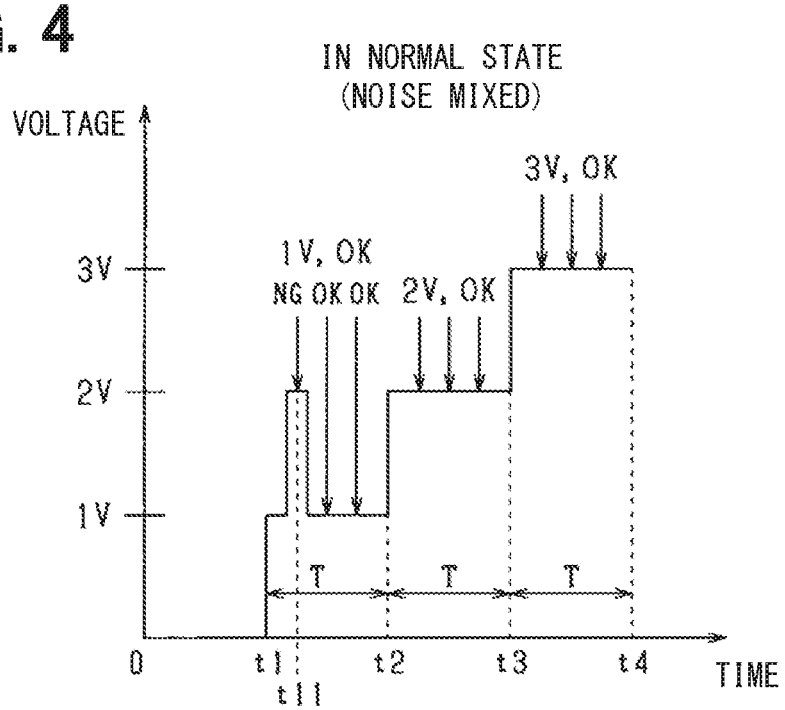
FIG. 4 is a time chart showing analog voltages in a normal state (noise mixed)

FIG. 4 is a time chart showing analog voltages when noise is mixed in a normal state. From the time t1 to the time t2, the determination portion 42 considers that the one digital signal ds output at the time t11 of the three digital signals ds output from the ADC 43 is not identical to the digital signal ds (1V), and considers that the two remaining digital signals ds are identical to the digital signal ds (1V) corresponding to the operation command a. The determination portion 42 determines that the first operation command executed by the microcontroller A 30 is normal. The determination portion 42 further determines that the second and third operation commands (time t2 to time t3 and time t3 to time t4) executed by the microcontroller A 30 are normal. The determination portion 42 determines that the microcontroller A 30 is normal as a comprehensive result.

Figure 5:
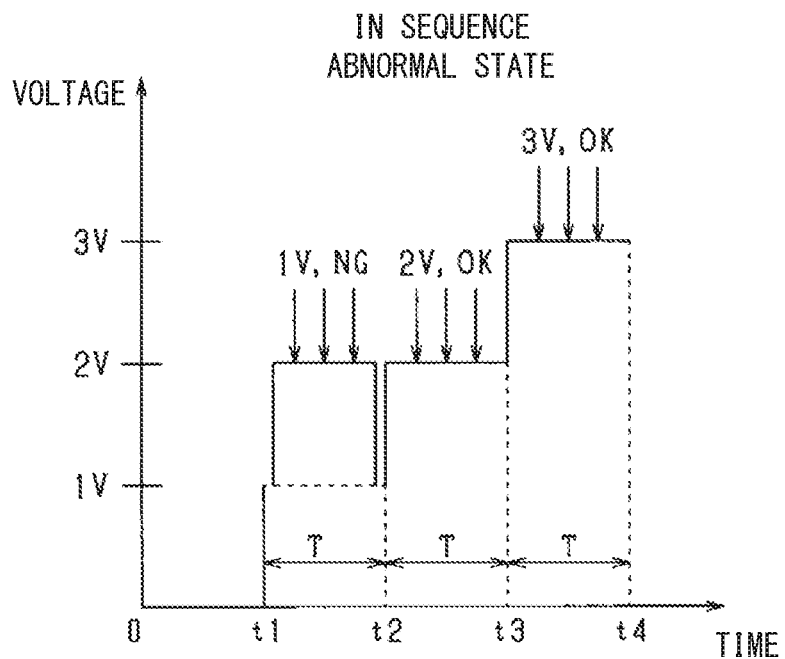
FIG. 5 is a time chart showing analog voltages in a sequence abnormal state.

FIG. 5 is a time chart showing analog voltages in a sequence abnormal state. From the time t1 to the time t2, the determination portion 42 determines that none of the three digital signals ds output from the ADC 43 is identical to the digital signal ds (1V). The determination portion 42 therefore determines that the first operation command executed by the microcontroller A 30 is abnormal. The determination portion 42 further determines that the second and third operation commands (time t2 to time t3 and time t3 to time t4) executed by the microcontroller A 30 are normal. The determination portion 42 therefore determines that the microcontroller A 30 is abnormal as a comprehensive result.

Figure 6:
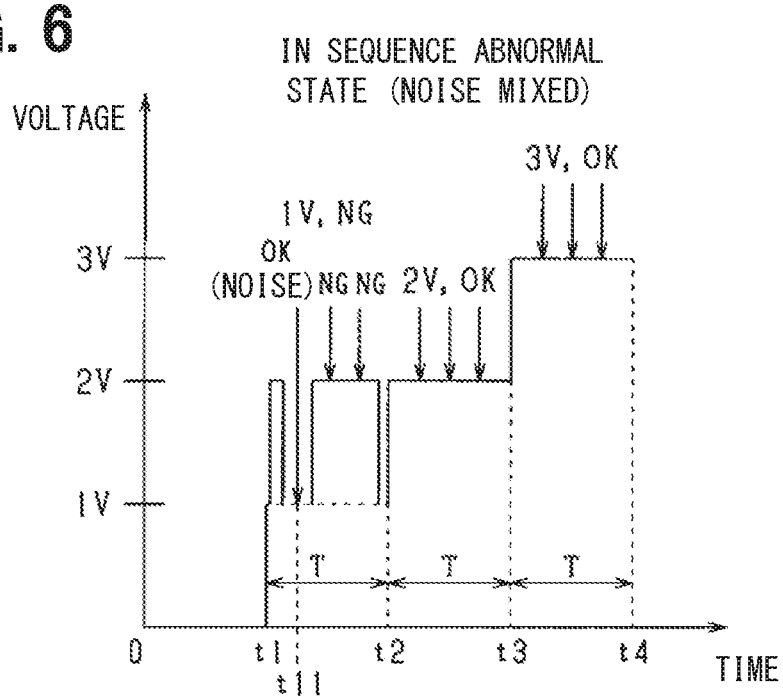
FIG. 6 is a time chart showing analog voltages in a sequence abnormal state (noise mixed)

FIG. 6 is a time chart showing analog voltages when noise is mixed in a sequence abnormal state. From the time t1 to the time t2, the determination portion 42 considers that the one digital signal ds output at the time t11 of the three digital signals ds output from the ADC 43 is identical to the digital signal ds (1V), and considers that the two remaining digital signals ds are not identical to the digital signal ds (1V) corresponding to the operation command a. The determination portion 42 therefore determines that the first operation command executed by the microcontroller A 30 is abnormal. The determination portion 42 further determines that the second and third operation commands (time t2 to time t3 and time t3 to time t4) executed by the microcontroller A 30 are normal. The determination portion 42 determines that the microcontroller A 30 is abnormal as a comprehensive result. When noise is mixed, it is rare that the digital signal ds output at time t11 accidentally falls between the lower limit value th11 and the upper limit value th12 of the digital signal ds (1V).

Figure 7:
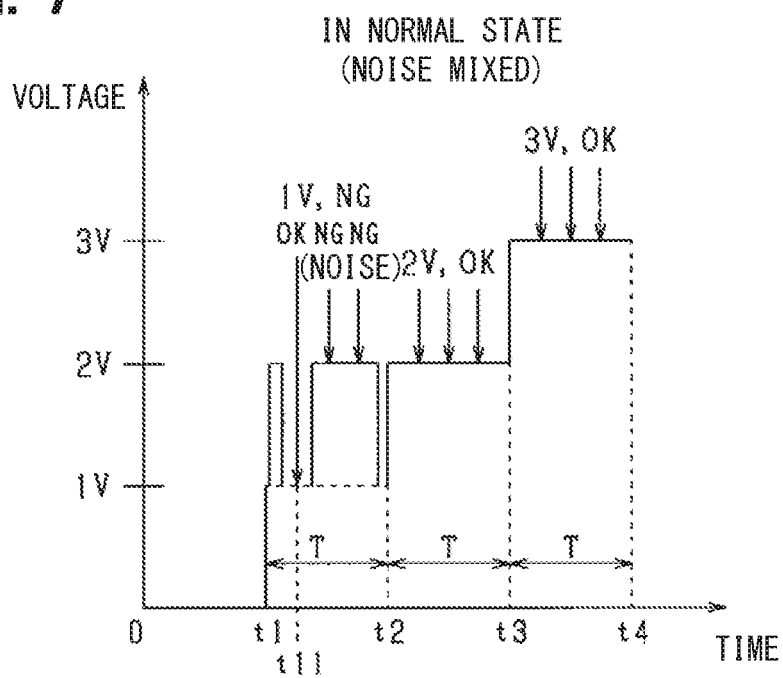
FIG. 7 is a time chart showing analog voltages in a normal state (noise mixed).

FIG. 7 is a time chart showing analog voltages when noise is mixed in a normal state. From the time t1 to the time t2, the determination portion 42 considers that the one digital signal ds output at the time t11 of the three digital signals ds output from the ADC 43 is identical to the digital signal ds (1V), and considers that the two remaining digital signals ds are not identical to the digital signal ds (1V) corresponding to the operation command a. The determination portion 42 therefore determines that the first operation command executed by the microcontroller A 30 is abnormal although the first operation command is normal. The determination portion 42 further determines that the second and third operation commands (time t2 to time t3 and time t3 to time t4) executed by the microcontroller A 30 are normal. The determination portion 42 therefore determines that the microcontroller A 30 is abnormal as a comprehensive result. In other words, the determination portion 42 erroneously determines that the microcontroller A 30 is abnormal in the state that the microcontroller A 30 is normal. However, this erroneous determination is less likely to cause problems in terms of safety than the case where the microcontroller A 30 is erroneously determined to be normal in the state that the microcontroller A 30 is abnormal.

The present embodiment described above in detail has the following advantages, for example.

The ADC 43 of the microcontroller B 40 receives respective analog voltages sequentially transmitted, sequentially converts the respective received analog voltages several times within the predetermined period T into the respective digital signals ds indicating the respective voltage values corresponding to the respective analog voltages, and outputs the digital signals ds. Accordingly, it may be possible for the ADC 43 to output the respective analog voltages corresponding to the respective operation commands multiple times within the predetermined period T. Furthermore, each of the operation commands is represented by a magnitude of the corresponding analog voltage. Accordingly, it may be possible to shorten the predetermined period T required for continuously transmitting the respective analog voltages rather than a period required for transmitting the digital signals ds each representing the corresponding operation command.

The determination portion 42 determines whether the microcontroller A 30 is normal based on the comparison between the multiple digital signals ds sequentially output from the ADC 43 and the respective digital signals ds corresponding to the respective operation commands of the predetermined operation command. It may be possible to determine whether each of the operation commands executed by the microcontroller A 30 is normal substantially multiple times. Accordingly, the functional safety module for the industrial devices is capable of promptly determining whether the microcontroller A 30 is normal while reducing erroneous determination that the microcontroller A 30 is abnormal. In particular, whether a sequence pattern (corresponding to an operation sequence) supposed to be received by the microcontroller B 40 is kept received in a correct order by monitoring not only the single digital signal ds, but also the entire sequence pattern. In this manner, it may be possible to detect an abnormal skip of a program (corresponding to an operation command) supposed to be executed even when the program seems to be operating normally.

The ADC 43 converts the received respective analog voltages three times within the predetermined period T into the respective digital signals ds indicating the respective voltage values corresponding to the respective analog voltages, and outputs the digital signals ds. Accordingly, a determination whether the operation commands executed by the microcontroller A 30 are normal are executed substantially three times. Furthermore, continuity of the signals is checked to determine whether the microcontroller A 30 is normal based on a comparison result between the three digital signals ds and the respective digital signals ds corresponding to the respective operation commands of the predetermined operation command.

When the respective operation commands executed by the microcontroller A 30 are abnormal, a degree of a difference between the respective digital signals ds output from the ADC 43 and the respective digital signals ds corresponding to the respective operation commands of the predetermined operation command becomes larger than a predetermined degree. Accordingly, the respective digital signals ds output from the ADC 43 are not considered to be identical to the respective digital signals ds corresponding to the respective operation commands of the predetermined operation command. When the respective operation commands executed by the microcontroller A 30 are normal, the degree of the difference between the respective digital signals ds output from the ADC 43 and the respective digital signals ds corresponding to the respective operation commands of the predetermined operation command becomes smaller than the predetermined degree. Accordingly, the respective digital signals ds output from the ADC 43 are considered to be identical to the respective digital signals ds corresponding to the respective operation commands of the predetermined operation command.

It is rare that the respective analog voltages transmitted from the DAC 33 are accidentally close to analog voltages corresponding to the respective normal operation commands when the respective operation commands executed by the microcontroller A 30 are abnormal and noise is mixed in the respective received analog voltages. Accordingly, it may be possible to prevent an erroneous determination that the respective operation commands executed by the microcontroller A 30 are normal, when the respective operation commands executed by the microcontroller A 30 are abnormal.

When the duration of the respective digital signals output from the voltage value output portion 32 deviates from the predetermined period T, the respective digital signals ds output from ADC 43 are not considered to be identical to the respective digital signals ds corresponding to the respective operation commands of the predetermined operation command, similarly to the above. As a result, it may be possible for the determination portion 42 to determine that the microcontroller A 30 is abnormal.

The embodiment described above may be modified in the following manners. Parts identical to the parts in the embodiment described above are denoted identical reference numerals, and not repeatedly explained.

The determination portion 42 may determine that at least either the DAC 33 or the ADC 43 is abnormal based on the comparison between the multiple digital signals sequentially output from the ADC 43 and the respective digital signals corresponding to the respective operation commands of the predetermined operation command. More specifically, the determination portion 42 may determine that at least either the DAC 33 or the ADC 43 is abnormal when all the digital signals output from the ADC 43 have values not expected as values of the respective digital signals corresponding to the respective operation commands of the predetermined operation command, i.e., when the respective values are 1.5 V, 2.5 V, and 3.5 V, or all the values are 0 V, for example.

The DAC 33 may sequentially transmit the analog voltages in an order from the analog voltage corresponding to the operation command finally executed to the analog voltage corresponding to the operation command initially executed after execution of the predetermined operation command by the CPU 31. Subsequently, the CPU 41 may obtain the respective digital signals ds (1V), ds (2V), ds (3V) corresponding to the respective operation commands a, b, and c of the predetermined operation command as expected values in a reverse order corresponding to the respective operation commands a, b, and c of the predetermined operation command executed by the microcontroller A 30.

The determination portion 42 may check continuity of the signals based on a comparison result between the four or more digital signals ds output from the ADC 43 and the digital signals ds corresponding to the respective operation commands of the predetermined operation command, and determine whether the microcontroller A 30 is normal. Alternatively, the determination portion 42 may determine whether the microcontroller A 30 is normal based on decision by majority made from a comparison result between the three or more (or the four or more) digital signals ds output from the ADC 43 and the digital signals ds corresponding to the respective operation commands of the predetermined operation command.

The determination portion 42 may determine that a degree of a difference between the two types of digital signals is smaller than a predetermined degree under a condition that a ratio of the two types of digital signals falls within a predetermined range including 1. For example, when the ratio of the respective digital signals ds output from the ADC 43 to the respective digital signals ds corresponding to the respective operation commands of the predetermined operation command is larger than 0.9 and smaller than 1.1, the determination portion 42 determines that the degree of the difference between these digital signals ds is smaller than the predetermined degree.

The determination portion 42 may determine that noise has been produced when the number of results that the three or more digital signals output from the ADC 43 are considered to be identical to the respective digital signals corresponding to the respective operation commands of the predetermined operation command is larger than the number of results that these digital signals are not considered to be identical to each other in the presence of at least one result that these digital signals are not considered to be identical to each other. For example, the determination portion 42 may determine that noise has been produced for the analog voltage from the time t1 to the time t2 in FIG. 4. According to this configuration, the determination portion 42 is capable of determining not only whether the microcontroller A 30 is normal, but also whether noise has been produced.

The determination portion 42 may determine in the predetermined period T whether the microcontroller A 30 is normal based on a comparison between a length of a period in which the respective digital signals output from the ADC 43 are considered to be identical to the respective digital signals corresponding to the respective operation commands of the predetermined operation command and a length of a period in which these digital signals are not considered to be identical to each other.

The CPU 31 may have the function of the voltage value output portion 32. The CPU 41 may have the function of the determination portion 42. Incidentally, the voltage value output portion 32 may be a circuit. The determination portion 42 may be a circuit.

The microcontroller A 30 may include the ADC 43, while the microcontroller B 40 may include the DAC 33. The microcontroller A 30 may determine whether the microcontroller B 40 is normal similarly to the embodiment described above.

The functional safety module 20 is not limited to a functional safety module connected between the safety PLC 100 and the emergency stop switch 110 to manage safety according to the state of the emergency stop switch 110. In other words, the functional safety module 20 may be a functional safety module connected between the controller 120 and the emergency stop switch 110 to manage safety according to the state of the emergency stop switch 110. Alternatively, the functional safety module 20 may be a functional safety module connected between the safety PLC 100 and a human sensor to manage safety according to a state of the human sensor.

Incidentally, each of the safety PLC 100, the emergency stop switch 110, the controller 120, and the human sensor may be an example of an industrial device.

While various embodiments, configurations, and aspects of a functional safety module for industrial devices according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A functional safety module for industrial devices, the functional safety module being connected between the industrial devices to manage safety according to a state of the industrial devices, the functional safety module comprising:
    a first controller and a second controller each configured to execute a common predetermined operation command including a plurality of operation commands, wherein:
    the first controller is configured to
        sequentially output respective digital signals indicating respective predetermined voltage values corresponding to respective operation commands executed by the first controller, each predetermined voltage value being set, in advance, to be different from one another corresponding to each operation command, and
        sequentially convert the respective digital signals sequentially output into respective analog voltages each of which continues for a predetermined period, and transmit the respective analog voltages; and
    the second controller is configured to
        receive the respective analog voltages sequentially transmitted from the first controller, sequentially convert the received analog voltages a plurality of times within the predetermined period into respective digital signals indicating respective voltage values corresponding to the respective analog voltages, and output the respective digital signals, and
        determine whether the first controller is normal based on a comparison between the respective digital signals sequentially output from the second controller and the respective digital signals corresponding to the respective operation commands of the predetermined operation command.

2. The functional safety module for the industrial devices according to claim 1, wherein the second controller is further configured to:
    convert the received respective analog voltages three times or more as three or more respective digital signals, within the predetermined period into respective digital signals indicating respective voltage values corresponding to the respective analog voltages, and output the respective digital signals; and
    check a continuity of signals based on a comparison result between the three or more respective digital signals output from the second controller and the respective digital signals corresponding to the respective operation commands of the predetermined operation command, and determine whether the first controller is normal.

3. The functional safety module for the industrial devices according to claim 2, wherein the second controller is further configured to:
    determine that the first controller is normal in response to the second controller confirming the continuity of a result that the three or more respective digital signals output from the second controller are considered to be identical to the respective digital signals corresponding to the respective operation commands of the predetermined operation command.

4. The functional safety module for the industrial devices according to claim 2, wherein the second controller is further configured to:
    determine that the first controller is abnormal in response to a total number of results that the three or more respective digital signals output from the second are not considered to be identical to the respective digital signals corresponding to the respective operation commands of the predetermined operation command being larger than a total number of results that the three or more respective digital signals are considered to be identical to the respective digital signals.

5. The functional safety module for the industrial devices according to claim 2, wherein the second controller is further configured to:
    determine that a noise occurs in response to a total number of results that the three or more respective digital signals output from the second controller are considered to be identical to the respective digital signals corresponding to the respective operation commands of the predetermined operation command is larger than a total number of results that the three or more respective digital signals are not considered to be identical to the respective digital signals and also in response to a presence of at least one result that the three or more respective digital signals are not considered to be identical to the respective digital signals.

6. The functional safety module for the industrial devices according to claim 1, wherein the second controller is further configured to:
    consider that the respective digital signals output from the second controller are identical to the respective digital signals corresponding to the respective operation commands of the predetermined operation command under a condition that a degree of a difference between the respective digital signals output from the second controller and the respective digital signals corresponding to the respective operation commands of the predetermined operation command is smaller than a predetermined degree.

7. The functional safety module for the industrial devices according to claim 1, wherein the second controller is further configured to:
    determine that at least either the first controller or the second controller is abnormal based on a comparison between the respective digital signals sequentially output from the second controller and the respective digital signals corresponding to the respective operation commands of the predetermined operation command.

8. A functional safety module for industrial devices comprising:
    a first microcontroller configured to execute a predetermined operation command including a plurality of operation instructions;
    a second microcontroller configured to execute the predetermined operation command including the plurality of operation instructions, wherein:

the functional safety module is connected between the industrial devices to manage safety according to a state of the industrial devices;

the first microcontroller sequentially outputs respective digital signals indicating respective predetermined voltage values corresponding to respective operation instructions executed by the first microcontroller, each predetermined voltage value being set, in advance, to be different from one another corresponding to each operation command, sequentially converts the respective digital signals sequentially output into respective analog voltages each of which continues for a predetermined period, and transmits the respective analog voltages to the second microcontroller; and the second microcontroller receives the respective analog voltages sequentially transmitted from the first microcontroller, sequentially converts the received analog voltages a plurality of times within the predetermined period into respective digital signals indicating respective voltage values corresponding to the respective analog voltages, outputs the respective digital signals, determines whether the first microcontroller is in a normal state based on a comparison between the respective digital signals sequentially output from the second microcontroller and the respective digital signals corresponding to the respective operation instructions of the predetermined operation command.

9. The functional safety module for the industrial devices according to claim 1, wherein:

the predetermined period is a period shorter than a period required to transmit the respective digital signals indicating respective voltage values from the first controller to the second controller by a serial communication, and equal to or longer than a period sufficient for the second controller to convert the respective analog voltages into the respective digital signal and outputting the converted respective digital signals.

10. The functional safety module for industrial devices according to claim 8, wherein:

the predetermined period is a period shorter than a period required to transmit the respective digital signals indicating respective voltage values from the first controller to the second controller by a serial communication, and equal to or longer than a period sufficient for the second controller to convert the respective analog voltages into the respective digital signal and outputting the converted respective digital signals.

* * * * *